US008316554B2

(12) United States Patent
Lutze

(10) Patent No.: US 8,316,554 B2
(45) Date of Patent: Nov. 27, 2012

(54) MEASURING GAUGE AND METHOD FOR DETERMINING THE DIAMETER OR CROSS-SECTIONAL AREA OF AN OBJECT WHOSE CROSS-SECTIONAL SHAPE IS ADJUSTABLE

(75) Inventor: Peter Lutze, Bermbach (DE)

(73) Assignee: Rennsteig Werkzeuge GmbH, Viernau (DE)

( * ) Notice: Subject to any disclaimer, the term of this patent is extended or adjusted under 35 U.S.C. 154(b) by 627 days.

(21) Appl. No.: 12/596,421

(22) PCT Filed: Apr. 14, 2008

(86) PCT No.: PCT/EP2008/054514
§ 371 (c)(1),
(2), (4) Date: Oct. 16, 2009

(87) PCT Pub. No.: WO2008/125666
PCT Pub. Date: Oct. 23, 2008

(65) Prior Publication Data
US 2010/0107432 A1   May 6, 2010

(30) Foreign Application Priority Data
Apr. 16, 2007 (DE) .......................... 10 2007 018 199

(51) Int. Cl.
*G01B 5/08* (2006.01)
(52) U.S. Cl. .......................................... 33/555.1; 33/550
(58) Field of Classification Search .................... 33/543, 33/550, 555.1, 555.2, 555.3, 555.4
See application file for complete search history.

(56) References Cited

U.S. PATENT DOCUMENTS

| 1,553,961 | A | * | 9/1925 | Pryce | 33/555.3 |
|---|---|---|---|---|---|
| 2,374,830 | A | | 5/1945 | Nock | |
| 2,413,566 | A | * | 12/1946 | Hohwart et al. | 33/555.2 |
| 2,728,145 | A | * | 12/1955 | Holladay | 33/555.2 |
| 5,617,644 | A | * | 4/1997 | Bonelli | 33/548 |
| 6,996,913 | B2 | * | 2/2006 | Lum et al. | 33/550 |
| 8,151,479 | B1 | * | 4/2012 | Carnegie | 33/555.2 |
| 2003/0131489 | A1 | * | 7/2003 | Hsiao | 33/555.2 |
| 2005/0229418 | A1 | | 10/2005 | Cohen | |
| 2010/0288833 | A1 | * | 11/2010 | Santos et al. | 33/555.2 |

FOREIGN PATENT DOCUMENTS

| GB | 227381 A | 1/1925 |
|---|---|---|
| JP | 04-118501 A | 4/1992 |

* cited by examiner

*Primary Examiner* — G. Bradley Bennett
(74) *Attorney, Agent, or Firm* — Mark D. Wieczorek, Esq.; Mayer & Williams PC

(57) ABSTRACT

The invention relates to a measuring gauge and a method for determining the diameter or cross-sectional area of an object whose cross-sectional shape is adjustable such as, for example, a litz conductor. A first measuring disc comprising a helical slot running around the center of the measurement disc and tapering down is connected in a rotatable fashion by a central axial connection to a second measurement disc comprising a slot running steadily from the vicinity of the center to the edge, the slot tapering in the same direction as the slot of the first measuring disc. A material measure for reading the detected measurement is provided on one of the two measurement discs. When the measurement discs are counter-rotated to one another, the overlapping sections of the slots form an opening into which the object to be measured is inserted, and the size of the opening is altered by counter-rotating the measurement discs to one another. The diameter or the cross-sectional surface of the remaining opening may be read from the material measure.

15 Claims, 3 Drawing Sheets

MEASURING GAUGE AND METHOD FOR DETERMINING THE DIAMETER OR CROSS-SECTIONAL AREA OF AN OBJECT WHOSE CROSS-SECTIONAL SHAPE IS ADJUSTABLE

FIELD OF THE INVENTION

The invention relates to a measuring gauge and a method for determining the diameter or cross-sectional area of an object whose cross-sectional shape is adjustable such as, for example, a litz conductor.

BACKGROUND OF THE INVENTION

A litz conductor is an electrical conductor that consists of thin individual wires and is therefore easy to bend. The up to several hundred individual wires of the litz are mostly enclosed in a common insulating sheath.

Litz conductors are primarily used where frequent movements or shaking loads occur—for example, machines, motor vehicles and aircraft and robots—or where a mobile device must be provided, as for example electrical hand tools, network connections capable of being plugged in, or microphone and speaker cables. Depending on the requisite flexibility and degree of loading, litz conductors are used with thin or ultra-thin wires.

In particular applications, the conductors are packaged, that is, provided with multi-core cable ends, cable shoes, plug connections or the like.

This packaging is customarily undertaken using so-called crimping. With this, a force-locked, homogeneous, undetachable connection is made between the conductor and the connecting element, which ensures a high level of electrical and mechanical safety. Generally, where it is not easy to lay a pre-packaged cable, the cable alone is laid to the target location, and only there is an electrical contact piece attached, mostly by crimping, to the end of the lead. With the aid of crimping pliers, the plug and cable are connected in a force-locked fashion, mostly with a first crimping connection generated in the insulated area and a second crimping connection at the insulated end of the cable to produce the electrical connection.

Along with connection safety, crimping also achieves considerable simplification in handling. The connection is produced by pressure, with tuned crimp profiles causing a precisely preset deformation of the connecting element and lead precisely at the connecting piece and lead cross section.

If cables are packaged only after being laid, i.e., provided with the requisite connections, then, especially in large wire harnesses with many different line cross sections, the result can be that on-site technical personnel may not be able to choose suitable crimping profiles for the particular cables or litzes, especially because, with the smaller lead cross sections, it simply may not be possible to scrutinize the result to assess the lead cross section.

The results are either electrical and/or mechanical connections that are too loose and become detached on their own, or incomplete crimp connections, in which a part of the litz conductor not connected in form-locked fashion with the contact untangles, which under certain circumstances may lead to short circuits in the wire harness.

Using, for example, a vernier to measure the diameter of the lead produces erroneous readings due to the mobility of the litz conductor; the individual wires are pushed against each other and compressed flat by the legs of the vernier, so that it is not possible to precisely determine the cross-sectional area.

Measurement of the diameter of the lead with insulation would be possible, but cannot necessarily be inferred from the lead cross section, because insulation may have varied thicknesses with different types of leads.

U.S. Pat. No. 2,374,830 A discloses a measuring gauge for determining the thickness of knitting needles and other objects having a circular cross section. The measuring gauge consists of a housing with a tapered spigot slot through which the object can be run. The display comprises a scale and a display element which is pressed using a spring against the object to be measured, to allow a readout of the diameter on the scale.

JP 04-118501A represents a solution for checking the cross-sectional form of an object. The measuring instrument consists of an upper and lower measuring strip, between which the measured object is placed, with measurement conducted by two interlocking contact surfaces in the tool.

SUMMARY OF THE INVENTION

The task that is the basis of the invention is to provide a device for determining the diameter and/or the cross-sectional area of an object whose cross-sectional form is altered when force is applied. Specifically, simple and precise determination of the lead cross section of litzes should be made possible.

According to the invention, the problem is solved by a measuring gauge with the features of claim 1 or of claim 15, and by a process with the features of claim 14.

The advantages of the invention are especially to be seen in that the installer can easily and quickly do an on-site determination of the actual lead cross section, avoiding incorrect packaging of the lead and thus also avoiding technical breakdowns.

According to the invention, a measuring gauge comprises at least a first measuring disk and a second measuring disk. The first measuring disk has a slot which has a spiral shape. The spiral tapers in width along its course, either from the interior outwards or from the outer part toward the interior. The second measuring disk also has a slot on which there is a taper in the same direction as with the slot in the first disk. The slot of the second measuring disk has a constant course, going from the vicinity of the center of the measuring disk outwards. The slot of the second measuring disk can be designed as a straight line or also as a spiral.

The width of the slots in the measuring disks ranges at least from the largest possible diameter of a cross-sectional area to be determined to the smallest diameter to be measured.

The measuring disks are placed coaxially one above the other in such a way that the slots overlap to make a residual opening. If the measuring disks are counter-rotated to one another, the size in the clear and also the position of the opening are changed.

Preferably the slot of the second measuring disk is congruent to that of the first measuring disk, and the measuring disks are placed in specular symmetry, thus resulting in an essentially rhombus-shaped opening in the overlap area.

In an especially preferred embodiment of the invention, a third measuring disk is placed coaxially with the other two measuring disks, which has a radially-running slot, that tapers in the same direction as the slots of the other two disks. If the first and the second measuring disk are counter-rotated to one another, then the residual opening in the area where the slots of all three disks overlap has an essentially hexagonal form.

Providing additional measuring disks also is within the scope of the invention. Preferably they have a spiral shape with a different length. By using additional measuring disks, the residual opening can further be approximated to a circular shape. True, care then must be taken that the disks are so rotated relative to each other that a penetrating opening still remains free. For this possibly an appropriate transmission or a drive must be provided between the separate disks.

For determination of the cross-sectional area or of the diameter of an object whose cross-sectional form can be altered, first the opening is set to such a size that the object can be inserted into the opening. Then the measuring disks are counter-rotated to each other until the object is securely held in the opening. Due to the opening becoming smaller from all sides, the object to be measured is compressed centrically, so that the diameter of the object can be determined to a good approximation, from which then the cross-sectional area can be computed or determined from an appropriate scaling.

The determined dimension, which is the diameter or the particularly pertinent cross-sectional surface, can be read out to a material measure which is applied to a measuring disk that lies without, along the slot or on the edge. The material measure becomes more precise, the longer the slot is, and therefore the material measure preferably is provided on the first measuring disk. The readout occurs on a section of the spiral in which the object protrudes out of the opening, or at a marking which lies opposite the material measure placed on the edge.

It has been shown to be particularly advantageous with a preferred embodiment form to provide a drive that permits a uniform relative counter-rotation of the measuring disks to each other. Depending on the area in which the measuring gauge is used, this may be a manual drive, with a handwheel for example, or also a mechanical drive with an appropriate gear.

In a very simple embodiment form, holding sections are placed on the outer edge of the measuring disk, which make possible a manual displacement of the disks. Preferably here also a drive is to be provided that controls the relative turning motion of the measuring disks.

In a preferred embodiment form, the measuring disks are manufactured out of plastic. Other materials such as aluminum or steel are also conceivable, however.

As a possible application for the invention, a description follows of determining the lead cross section of a litz conductor, which, according to the invention, represents an object whose cross-sectional form can be adjusted. However, the invention is not expressly restricted to this area of application. For example, the measuring gauge is also suited for determining the diameter of optical waveguides, with damage safely avoided even in thin conductors.

In still another preferred embodiment form of the invention, the measuring gauge comprises a material measure for the cross-sectional area and an additional material measure on which the diameter can be plotted. This makes possible a very simple determination of the lead cross section and overall diameter of the litz conductor. Since with an equal lead cross section, litz conductors may have insulation of varied thicknesses, different crimp contacts are also required. Measurement of lead cross section and insulation or overall diameter makes it easy to correctly choose the crimp contact to be used.

In addition, one of the measuring disks can include an additional aperture which, for example, is configured with a sharp edge, so that via rotation of the measuring disks, the measuring gauge also can be used to cut off or dismantle the litz conductor.

Likewise, it is conceivable to directly integrate the invention-specific measuring gauge into crimping pliers, or thus to implement automatic recognition of the litz conductor in a crimping machine, so that for example, after insertion of the lead, the requisite crimp contact can be measured and then automatically selected.

It is also advantageous, if measuring disks are manually operated, to use the disk area that is available and not being used to affix the material measure, as an area for advertisement.

As can be gleaned from the explanations provided before, it is important for the invention that two disks are displaced relative to each other, to alter the cross section of an opening which remains in the overlapping area through two tapering slots running on the measuring disks. Although it is advantageous to apply two or more disks that are rotatably placed, this principle can also be used with disks to be used in a linear fashion. An embodiment form to that effect is defined with greater detail in the appended claim 15.

A preferred embodiment form of the invention is depicted in the figures and will be explained in more detail in what follows.

DETAILED DESCRIPTION

Figure 1:
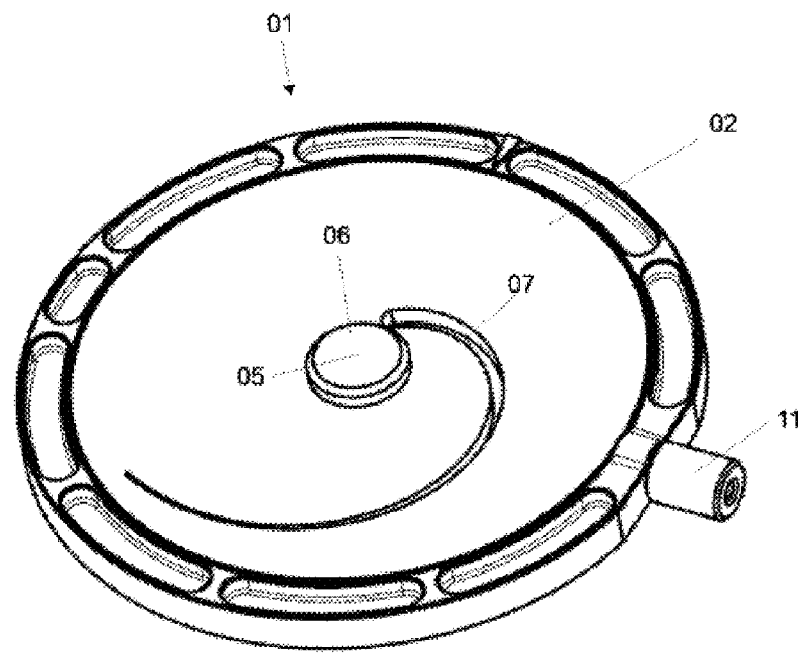
FIG. 1 shows a measuring gauge for determining a lead cross section in a three-dimensional view.
Figure 2:
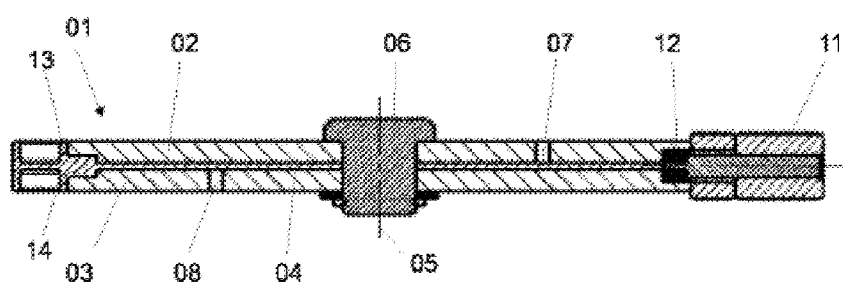
FIG. 2 shows the measuring gauge according to FIG. 1 in a cross-sectional view.

FIG. 1 is a three-dimensional view of an especially preferred embodiment form of a measuring gauge 01. The measuring gauge 01 depicted here is preferably suited to determine the lead cross section of a litz conductor, and for that reason in the pertinent description, reference is made only to this use. One skilled in the art can easily derive further application possibilities. FIG. 2 is a cross-sectional depiction in which the individual parts of measuring gauge 01 are more easily recognized.

The measuring gauge 01 comprises a first measuring disk 02, a second measuring disk 03 and a third measuring disk 04. Measuring disks 02, 03 and 04 are placed concentrically and are able to counter-rotate to each other, and in the center 05 are connected by an element comprising a rivet 06, a push button or the like.

The first and second measuring disks 02, 03 each have a helical slot 07, 08 that tapers down toward the outside. The third measuring disk 04 has a radially running slot 09, not shown here (see FIG. 4), which also tapers down toward the outside. The edges of slots 07, 08, 09 are preferably rounded off, so that one or more individual wires of the litz conductor do not get cut off or damaged inadvertently when measuring disks 02, 03 are rotated. The first and second measuring disks 02, 03 are placed in specular symmetry to each other, and third measuring disk 04 is in the plane of symmetry between the first and second disk.

Additionally, measuring gauge 01 comprises a manual wheel 11 with a pinion 12. Pinion 12 engages into each row of teeth 13, 14 of the first or second measuring disk 03 or 04, with the rows of teeth 13, 14 provided to form a circle on the inner sides facing each other of first or second measuring disk 02 or 03. If manual wheel 11 is turned, then the outer measuring disks 02 and 03 rotate counter to each other, corresponding to the gearing ratio that is determined by the rows of teeth 13, 14 and the pinion 12 that engages into them.

If differing spiral lengths are provided on the first and second measuring disk, the gearing of the rows of teeth is to be given different dimensions, so that when rotated, the desired opening always remains that is formed by the overlapping slots. For this, separated drive wheels are provided.

Figure 3:
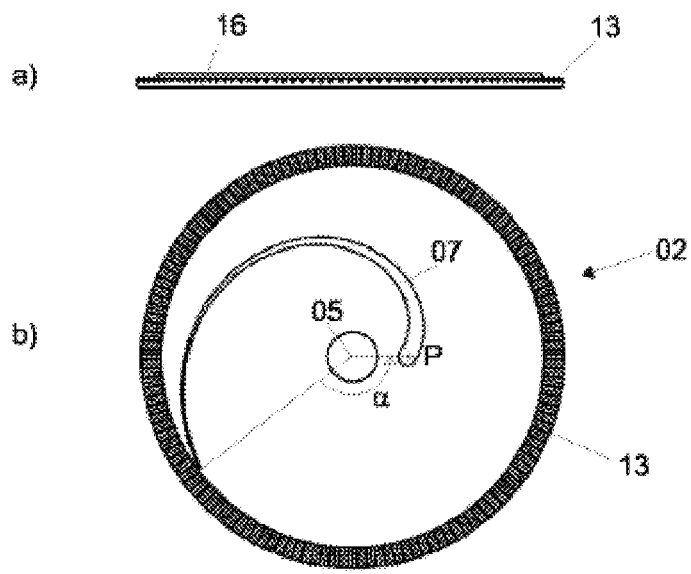
FIG. 3 shows a first measuring disk of the measuring gauge in a top view and in a side view.
Figure 4:
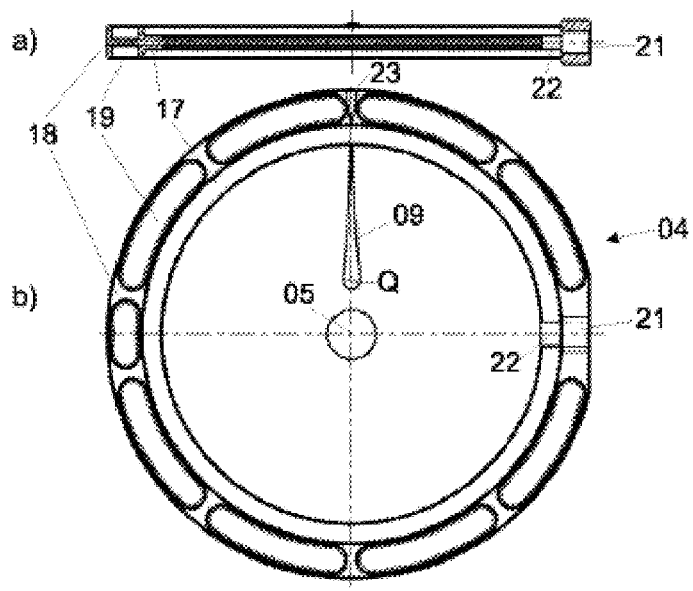
FIG. 4 shows a third measuring disk with a radially running slot in a top view and cross-sectional view.
Figure 5:
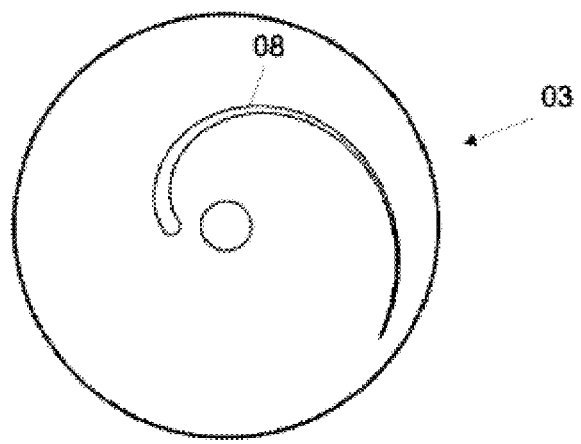
FIG. 5 shows a second measuring disk in a top view.

In FIGS. 3 to 5, the individual measuring disks 02, 04 and 03 are shown separately, and in fact the sequence of the figures corresponds to the sequence of measuring disks 02, 04, 03 that are placed on one another. The sequence of measuring disks shown here derives from structural reasons, but is not prescribed.

FIG. 3 shows in depiction a) a side view, and in depiction b) the inner side of first measuring disk 02. The row of teeth 13 is provided on the inner side of first measuring disk 02 on the outer edge, and is offset to a base surface 16. The interval between teeth is adjusted to the desired gear ratio and the pinion 11. Helical slot 07 runs from a point P close to the center counterclockwise with diminishing width at an angle α of about 220°. By a possible lengthening, the measured area or the resolution can be altered.

FIG. 4 shows the third measuring disk 04 in depiction a) as a cross section and in depiction b) as a top view. In depiction b), the progression of the radially running slot 09 is perceptible. Slot 09 runs from a point Q close to the center outward in a radial direction. Its width diminishes during its course. Adjoining the outer side of the third measuring disk, via an elevated section 17, is a gripping edge 18 with multiple recesses 19. At one location along the circumference, an aperture 21 is provided in the radial direction, through which the manual wheel 11 can be inserted when measuring gauge 01 is assembled. At the same location on the circumference, the elevated section 17 has an axial aperture 22 into which the pinion 12 is positioned in a connection allowing it to act as a drive with manual wheel 11. In addition, on gripping edge 18 a marking 23 is provided, at which the lead cross section can be read out on second measuring disk 03.

FIG. 5 shows second measuring disk 03 in a top view of the outer side. In this embodiment form it is designed to be identical to first measuring disk 02, and therefore no further explanation is provided here.

Figure 6:
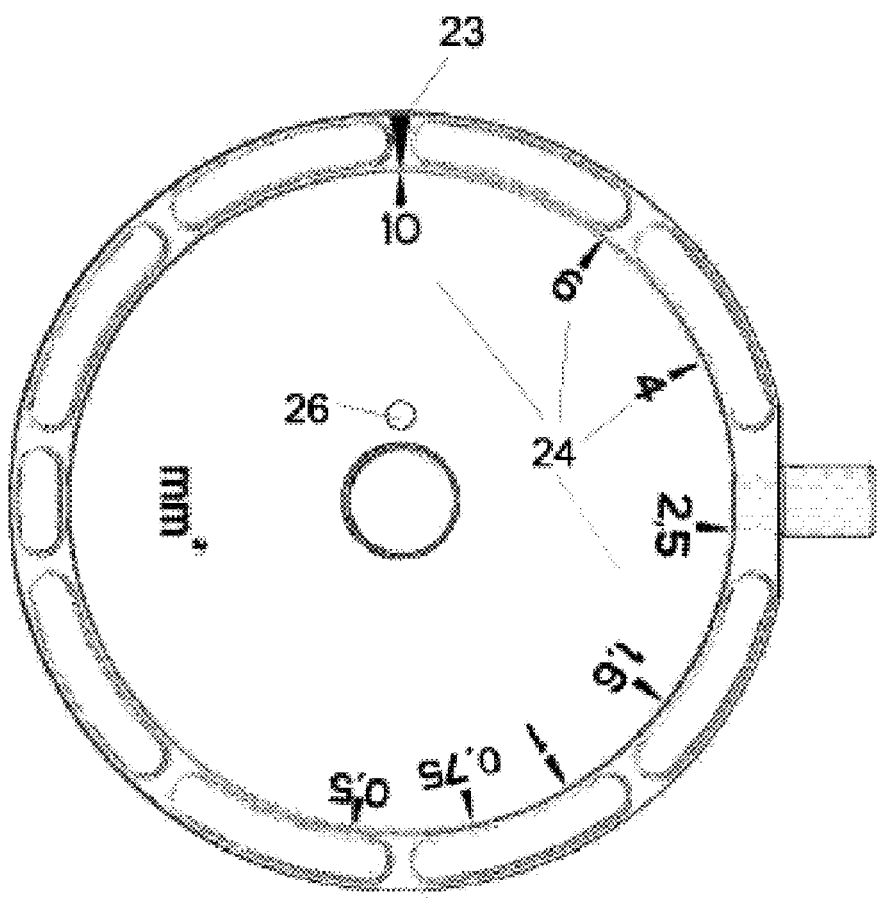
FIG. 6 shows the measuring gauge according to FIG. 1 in a top view with a depiction of a material measure.

In FIG. 6, the measuring gauge 01 is shown with a material measure 24 attached to second measuring disk 03. In this view the remaining opening 26 can be seen. The resulting lead cross sections are assigned via material measure 24 to the particular remaining opening cross section 26. These can be read out on the marking 23. With a further rotation of measuring disks 02, 03 the remaining opening 26 "migrates" outward, in correspondence to the radial slot 09 in third measuring disk 04. The depicted value of the material measure 24 that is shown opposite marking 23 corresponds to the lead cross section of a litz that fits exactly into the particular adjusted opening 26. For use as a measuring gauge to determine the lead cross section, it suffices to apply onto the material measure those lead cross sections actually used in the industry. The particular closest value that stands opposite marking 23 is the determined cross section of the litz employed, with sufficient precision.

Also conceivable would be colored or other markings along helical slot 07 on first measuring disk 02, which directly represent the lead cross section or the required crimp contact.

The invention claimed is:

1. A measuring gauge for determining a diameter or a cross-sectional area of an object whose cross section can be adjusted, with
    a first measuring disk, which has a helical slot that runs about the center of the measuring disk and which tapers down;
    a second measuring disk, which has a slot running constantly from the area of the center to the edge, which tapers down in the same direction as the slot of the first measuring disk;
    a material measure for reading out the measure determined, which is provided on one of the two measuring disks;
    with the measuring disks being placed one atop the other with a central axial connection and able to counter-rotate relative to each other, with the slots of the measuring disks configured to be applied by sections in overlap, so that they leave a through-running opening into which the object to be measured can be inserted, and through counterrotation of the measuring disks relative to each other, the width of the opening can be altered, and on the material measure the diameter and/or the cross-sectional area of the particular remaining opening can be read out.

2. The measuring gauge of claim 1, wherein the second measuring disk likewise has a helical slot, with the helical slots having a differing length, with the measuring disks so placed that the helical slots run counter to each other, and such that the opening has an essentially rectangular shape.

3. The measuring gauge of claim 1, wherein the first and the second measuring disk have a congruent helical slot, with them being placed in specular symmetry to each other, through which the opening essentially has a rectangular form.

4. The measuring gauge of claim 3, further comprising a third measuring disk that has a radially-running slot, which tapers down in the same direction as the slots of the first and second measuring disks, with the opening having an essentially hexagonal shape when the first and second measuring disks are counter-rotated to each other.

5. The measuring gauge of claim 1, wherein the material measure is provided on the first measuring disk.

6. The measuring gauge of claim 1, wherein the slot of the first measuring disk extends at maximum over one revolution (360°) of the disk.

7. The measuring gauge of claim 6, wherein the slot of the first measuring disk extends over an angle α=220°.

8. The measuring gauge of claim 1, further comprising at least one additional measuring disk with a helical slot, with the remaining opening having a polygonal cross section.

9. The measuring gauge of claim 1, wherein the width of the slots in the measuring disks constantly tapers down from the largest object cross section to be measured to the smallest object cross section to be measured.

10. The measuring gauge of claim 1, wherein the measuring disks include holding sections which are located on an outer edge of the measuring disks.

11. The measuring gauge of claim 1, further comprising a drive and a transmission unit for rotation of the measuring disks.

12. The measuring gauge of claim 11, wherein the drive is a manual wheel and the transmission unit includes a drive pinion which is attached onto the manual wheel so as to act as a drive, and engages into a row of teeth which is placed in circular fashion on the inward-facing side of the first or second measuring disk.

13. The measuring gauge of claim 1, wherein one of the measuring disks has formed therein an additional aperture which has a sharp edge, so that when the measuring disks are rotated, the object inserted into the additional aperture is subject to a shearing action.

14. A procedure for measurement of a cross-sectional surface of an object whose cross section can be altered, comprising:
   concentrically placing at least two measuring disks with a first measuring disk having a tapering helical slot and a second measuring disk, that lies opposite and parallel to the first measuring disk, having a steadily running slot that tapers down in the same direction, and overlapping sections of the slots of the measuring disks leaving open a through-running opening;
   inserting an object to be measured into the opening;
   counter-rotating the measuring disks relative to each other until the opening has become small enough that the measured object is securely clamped in the opening;
   reading out the cross-sectional area or the diameter on a material measure attached to one of the measuring disks.

15. A measuring gauge for determining a diameter or a cross-sectional area of an object whose cross section can be adjusted, with
   a first measuring disk which has a linear slot that runs in a first direction and which tapers down;
   a second measuring disk which has a linear slot running in a second direction and which tapers down;
   a material measure for reading out the measure determined which is provided on one of the two measuring disks;
   with the two measuring disks being placed one atop the other and configured to be adjusted against each other, with the slots of the measuring disks able to be applied by sections in overlap, so that they leave a through-running opening into which the object to be measured can be inserted, and through adjustment of the measuring disks relative to each other, the width of the opening can be altered, and on the material measure the diameter and/or the cross-sectional area of the particular remaining opening can be read out.

* * * * *